United States Patent
Mannoh et al.

(10) Patent No.: US 12,507,944 B2
(45) Date of Patent: Dec. 30, 2025

(54) COMBINED FLUORESCENCE AND LASER SPECKLE CONTRAST IMAGING SYSTEM AND APPLICATIONS OF SAME

(71) Applicant: VANDERBILT UNIVERSITY, Nashville, TN (US)

(72) Inventors: Emmanuel A. Mannoh, Nashville, TN (US); Anita Mahadevan-Jansen, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 1257 days.

(21) Appl. No.: 17/289,323

(22) PCT Filed: Nov. 4, 2019

(86) PCT No.: PCT/US2019/059610
§ 371 (c)(1),
(2) Date: Apr. 28, 2021

(87) PCT Pub. No.: WO2020/093034
PCT Pub. Date: May 7, 2020

(65) Prior Publication Data
US 2022/0007997 A1 Jan. 13, 2022

Related U.S. Application Data

(60) Continuation-in-part of application No. 16/471,049, filed as application No. PCT/US2017/068907 on Dec.
(Continued)

(51) Int. Cl.
*A61B 5/00* (2006.01)
*A61B 34/20* (2016.01)
(Continued)

(52) U.S. Cl.
CPC ............ *A61B 5/415* (2013.01); *A61B 5/0071* (2013.01); *A61B 5/0075* (2013.01);
(Continued)

(58) Field of Classification Search
CPC ..... A61B 5/415; A61B 5/0071; A61B 5/0075; A61B 5/0086; A61B 5/418; A61B 5/4227;
(Continued)

(56) References Cited

U.S. PATENT DOCUMENTS

| | | | |
|---|---|---|---|
| 2009/0118622 A1 | 5/2009 | Durkin et al. | |
| 2015/0198797 A1* | 7/2015 | Andre | A61B 90/361 348/80 |

(Continued)

FOREIGN PATENT DOCUMENTS

| | | |
|---|---|---|
| WO | 2017051229 A1 | 3/2017 |
| WO | 2018126114 A1 | 7/2018 |

OTHER PUBLICATIONS

Kirkpatrick, S. J., Duncan, D. D. & Wells-Gray, E. M. Detrimental effects of speckle-pixel size matching in laser speckle contrast imaging. Opt. Lett. 33, 2886 (2008).
(Continued)

*Primary Examiner* — Abid A Mustansir
(74) *Attorney, Agent, or Firm* — toutman pepper locke; Tim Tingkang Xia, Esq.

(57) ABSTRACT

A combined auto-fluorescence imaging and laser speckle contrast imaging (LSCI) system to enable intra-operative parathyroid identification and viability assessment with the same tool. The system includes a light source for emitting a beam of light to illuminate a target of interest, and an imaging head positioned over the target of interest for individually acquiring auto-fluorescence images and LSCI images of light from the illuminated target of interest
(Continued)

responsive to the illumination. Auto-fluorescence imaging helps identify the parathyroid, while LSCI helps assess its viability.

20 Claims, 12 Drawing Sheets

Related U.S. Application Data 29, 2017, now Pat. No. 11,589,801, said application No. PCT/US2009/052304 is a continuation-in-part of application No. 15/391,046, filed on Dec. 27, 2016, now Pat. No. 10,258,275, which is a division of application No. 13/056,469, filed as application No. PCT/US2009/052304 on Jul. 30, 2009, now Pat. No. 9,687,190.

(60) Provisional application No. 62/754,717, filed on Nov. 2, 2018, provisional application No. 62/540,767, filed on Aug. 3, 2017, provisional application No. 62/440,112, filed on Dec. 29, 2016, provisional application No. 61/137,520, filed on Jul. 30, 2008, provisional application No. 61/137,584, filed on Jul. 30, 2008.

(51) Int. Cl.
*G01N 21/64* (2006.01)
*G01N 21/65* (2006.01)

(52) U.S. Cl.
CPC ............ *A61B 5/0086* (2013.01); *A61B 5/418* (2013.01); *A61B 5/4227* (2013.01); *A61B 5/742* (2013.01); *A61B 34/20* (2016.02); *G01N 21/6456* (2013.01); *G01N 21/65* (2013.01); *A61B 2034/2055* (2016.02); *A61B 2505/05* (2013.01); *G01N 2021/6439* (2013.01); *G01N 2201/0221* (2013.01)

(58) Field of Classification Search
CPC . A61B 5/742; A61B 34/20; A61B 2034/2055; A61B 2505/05; A61B 2090/3618; A61B 2090/371; A61B 90/30; A61B 90/361; A61B 90/37; G01N 21/6456; G01N 21/65; G01N 2021/6439; G01N 2201/0221; G01N 21/474; G01N 2021/479; G01N 21/6486
See application file for complete search history.

(56) References Cited

U.S. PATENT DOCUMENTS

| | | | |
|---|---|---|---|
| 2015/0238126 A1* | 8/2015 | Saito ................... | A61B 5/1459 600/339 |
| 2016/0000324 A1* | 1/2016 | Rege ................... | A61B 3/1208 600/479 |
| 2017/0100037 A1 | 4/2017 | Harmelin et al. | |
| 2018/0228550 A1* | 8/2018 | Dupont ............... | A61B 6/5247 |
| 2018/0246309 A1* | 8/2018 | Brown .................... | H04N 1/17 |

OTHER PUBLICATIONS

Reddi, S. S., Rudin, S. F. & Keshavan, H. R. An optimal multiple threshold scheme for image segmentation. IEEE Trans. Syst. Man. Cybern. SMC-14, 661-665 (1984).
Xu, C. & Prince, J. L. Snakes, shapes, and gradient vector flow. IEEE Trans. Image Process. 7, 359-369 (1998).
Guizar-Sicairos, M., Thurman, S. T. & Fienup, J. R. Efficient subpixel image registration algorithms. Opt. Lett. 33, 156 (2008).
Mannoh, E. A., Thomas, G., Solorzano, C. C. & Mahadevan-Jansen, A. Intraoperative Assessment of Parathyroid Viability using Laser Speckle Contrast Imaging. Sci. Rep. 7, 14798 (2017).
Sun, G. H., DeMonner, S. & Davis, M. M. Epidemiological and Economic Trends in Inpatient and Outpatient Thyroidectomy in the United States, 1996-2006. Thyroid 23, 727-733 (2013).
Pattou, F., Combemale, F., Fabre, S., Carnaille, B., Decoulx, M., Wemeau, J., Radacot, A. & Proye, C. Hypocalcemia following Thyroid Surgery: Incidence and Prediction of Outcome. World J Surgery 22, 718-724 (1998).
Paras, C., Keller, M., White, L., Phay, J. & Mahadevan-Jansen, A. Near-infrared autofluorescence for the detection of parathyroid glands. J. Biomed. Opt. 16, 067012 (2011).
KIPO (ISA/KR), "International Search Report for PCT/US2019/059610", Korea, Apr. 8, 2020.

* cited by examiner

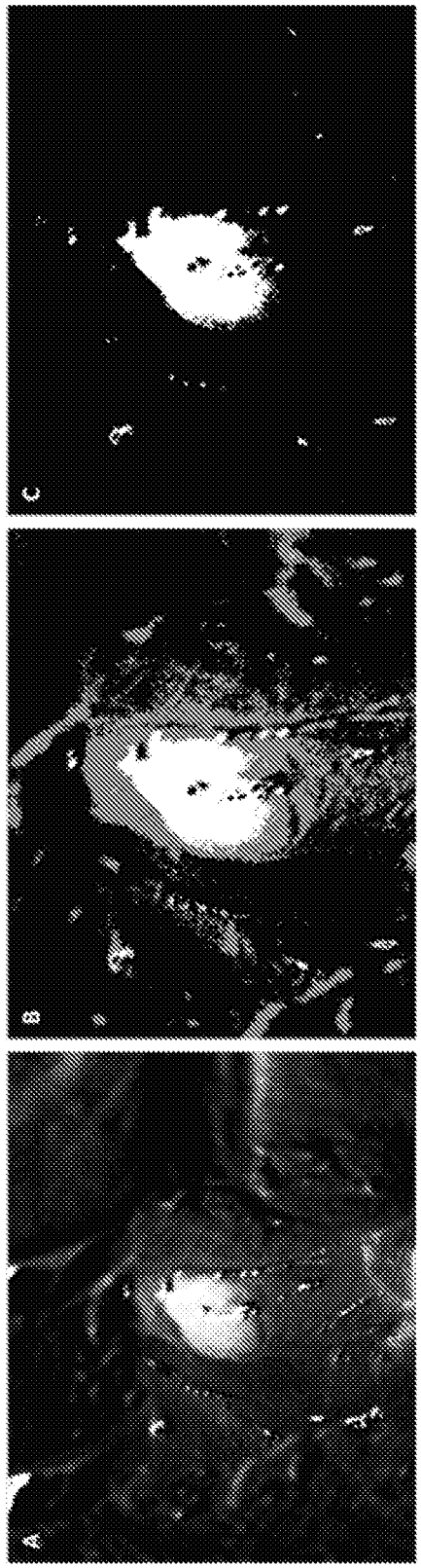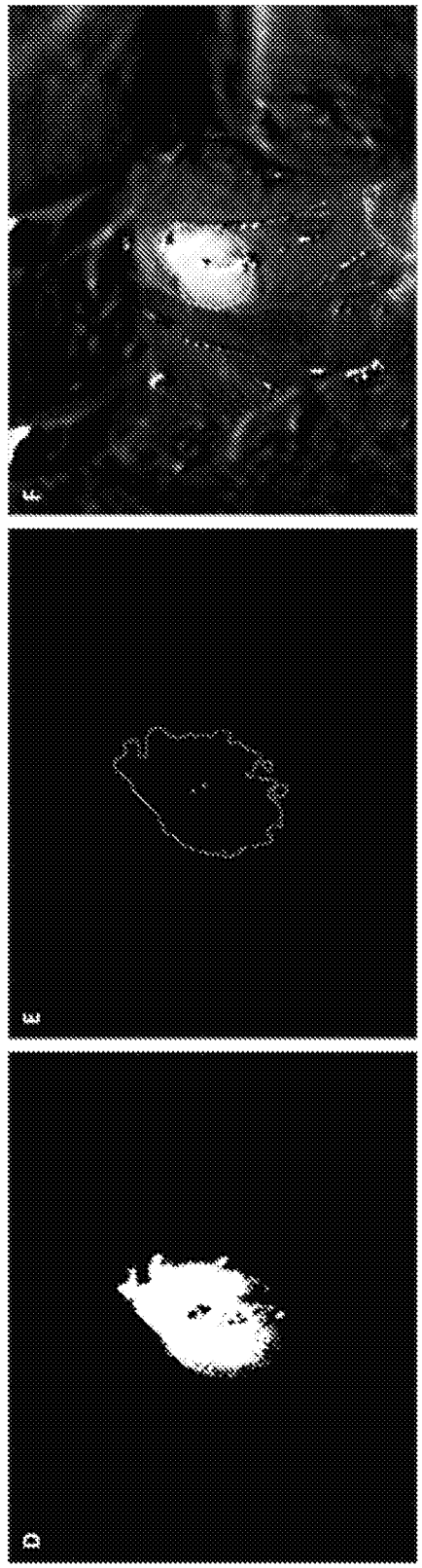

COMBINED FLUORESCENCE AND LASER SPECKLE CONTRAST IMAGING SYSTEM AND APPLICATIONS OF SAME

CROSS-REFERENCE TO RELATED PATENT APPLICATIONS

This PCT application claims priority to and the benefit of U.S. Provisional Patent Application Ser. No. 62/754,717, filed Nov. 2, 2018, which is incorporated herein by reference in its entirety, respectively.

This PCT application is a continuation-in-part application of U.S. application Ser. No. 16/471,049, filed Jun. 19, 2019, which is a national stage entry of PCT Application Serial No. PCT/US2017/068907, filed Dec. 29, 2017, which itself claims priority to and the benefit of U.S. Provisional Patent Application Ser. No. 62/440,112, filed Dec. 29, 2016, and U.S. Provisional Application Ser. No. 62/540,767, filed Aug. 3, 2017, and is a continuation-in-part application of U.S. application Ser. No. 15/391,046 ("the '046 Application"), filed Dec. 27, 2016, now U.S. Pat. No. 10,258,275. The '046 Application is a divisional patent application of U.S. patent application Ser. No. 13/056,469, filed Jun. 14, 2011, now U.S. Pat. No. 9,687,190, which is a national stage entry of PCT Application Serial No. PCT/US2009/052304, filed Jul. 30, 2009, which itself claims claims priority to and the benefit of U.S. provisional patent application Ser. Nos. 61/137,520, and 61/137,584, both filed Jul. 30, 2008. Each of the above-identified applications is incorporated herein by reference in its entirety, respectively.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

STATEMENT AS TO RIGHTS UNDER FEDERALLY-SPONSORED RESEARCH

This invention was made with government support under Contract No. 1R01CA212147-01A1 awarded by the National Institutes of Health (NIH). The government has certain rights in the invention.

FIELD OF THE INVENTION

The invention relates generally to optical assessments of bio-objects, and more particularly, to a combined auto-fluorescence imaging and laser speckle contrast imaging (LSCI) system to enable intra-operative parathyroid identification and viability assessment with the same tool and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

The endocrine system is a complex system of organs and glands which includes the thyroid and parathyroid. The anatomy of the neck is illustrated in FIG. 1. The thyroid gland regulates many developmental and metabolic processes. Common diseases of the thyroid include goiters, hyperthyroidism, hypothyroidism, benign and malignant nodules, and autoimmune diseases such as Graves' disease. Surgery is the most common treatment for Graves's disease, goiters, benign thyroid nodules, and thyroid cancers.

The parathyroid normally lies within the same region as the thyroid in the neck and functions to control calcium levels in the blood. The most common parathyroid disorder is primary hyperparathyroidism, in which one or more of the parathyroid glands become enlarged and hyperactive. This causes excess secretion of parathyroid hormone and a disruption in normal bone and mineral metabolism. The prevalence of primary hyperparathyroidism has been estimated at 21 cases per 100,000 person-years. In 80% of cases, primary hyperparathyroidism is caused by a single overactive parathyroid gland and surgical removal of the diseased parathyroid gland is the only definitive treatment.

Typically, there are four tan parathyroid glands, each approximately 6 to 8 mm in size. They are typically positioned within the neck but can vary in location within the body and are sometimes intrathymic. Due to their small size and variability in position, the parathyroid glands are often difficult to distinguish from surrounding tissue and thyroid in the neck. The parathyroid visually resembles its surrounding tissue and this can extend surgical time during a parathyroidectomy, during which the surgeon is simply searching for the small organ. Accidental removal or damage to healthy parathyroids during parathyroid or thyroid surgery can result in serious complications such as hypocalcemia or hypoparathyroidism. Hypoparathyroidism may result from direct injury, devascularization, and/or disruption of the parathyroid glands. Statistics suggest that temporary and permanent hypoparathyroidism rates are between 4-20% during thyroid surgery. The most common complications of both parathyroid and thyroid surgery are postoperative hypocalcemia, vocal-cord paralysis, and hematoma.

The current surgical procedure for thyroid and parathyroid surgeries involves a systematic search within the neck in which the surgeon is mainly relying on visual inspection to identify target tissues. The incidence of complications occurring due to this subjective method is directly proportional to the extent of thyroidectomy and inversely proportional to the experience of the surgeon. The disadvantages to the current method include the lengthy duration of the surgery, the exploratory nature of the surgery, and the lack of sensitive and applicable preoperative and intra-operative imaging. Confirmation of removal of the diseased parathyroid relies on histopathology or post-operative diagnosis of symptoms. There is a need for reliable methods for identifying the parathyroid glands intraoperatively. Moreover, while surgical guidance systems have been developed and utilized for brain surgery and other organ surgery procedures, none is available for thyroid and parathyroid surgeries.

Therefore, a heretofore unaddressed need exists in the art to address the aforementioned deficiencies and inadequacies.

SUMMARY OF THE INVENTION

One of the objectives of the invention is to provide a combined auto-fluorescence imaging and laser speckle contrast imaging (LSCI) system to enable intra-operative parathyroid identification and viability assessment with the same tool.

In one aspect, the invention relates to a system for intraoperative assessment of parathyroid gland viability of a living subject for guidance in a surgery. In one embodiment, the system includes a light source for emitting a beam of light to illuminate a target of interest; and an imaging head positioned over the target of interest for acquiring auto-fluorescence images and laser speckle contrast imaging (LSCI) images of light from the illuminated target of interest responsive to the illumination.

In one embodiment, the light source comprises a near-infrared laser. In one embodiment, the light source comprises a diode laser emitting the beam of light at a wavelength of about 785 nm.

In one embodiment, the imaging head comprises a detector disposed in a top portion of the image head for individually acquiring the auto-fluorescence images and the LSCI images; and a first lens and a second lens positioned in an optical path, wherein the first lens is adapted for collecting the light from the illuminated target of interest in a surgical field, and the second lens is adapted focusing the collected light to the detector.

In one embodiment, a ratio of a focal length of the first lens to that of the second lens is about 80/17.

In one embodiment, the imaging head further comprises a movable switching plate accommodating filters and an iris, being located between the first lens and the second lens, and operably moving between a first position and a second position, such that when the movable switching plate is in the first position, the filters are positioned in the optical path and the detector operably acquires the auto-fluorescence images, and when the movable switching plate is in the second position, the iris is positioned in the optical path and the detector acquires the LSCI images.

In one embodiment, the filters comprise a combination of first and second long-pass filters between a range of about 800 nm to about 830 nm, and wherein the iris comprises an iris with a diameter equal to or less than about 15 mm diameter.

In one embodiment, the imaging head further comprises a linear actuator configured to move the movable switching plate between the first position and the second position.

In one embodiment, the imaging head further comprises a beamsplitter positioned between the first lens and the second lens in the optical path for reflecting and transmitting the collected light into a first path and a second path, respectively, and a third lens positioned in the first path, wherein the reflected light in the first path is focused by the third lens to a first camera of the detector for acquiring the LSCI images, and the transmitted light in the second path is focused by the second lens to a second camera of the detector for acquiring the auto-fluorescence images. In this exemplary configuration, two cameras: the first and second cameras placed in the first and second paths, are used to individually acquire the LSCI images and the auto-fluorescence images, respectively.

In one embodiment, the imaging head further comprises a linear polarizer positioned between the beamsplitter and the third lens in the first path, and configured to have its axis of polarization oriented perpendicular to that on the illumination reducing specular reflections.

In one embodiment, the imaging head further comprises a mirror positioned between the linear polarizer and the third lens in the first path for achieving compactness.

In one embodiment, the imaging head further comprises an 808 nm long-pass filter positioned between the beamsplitter and the second lens in the second path, and a neutral density filter positioned between the beamsplitter and the third lens in the first path.

In one embodiment, the imaging head further comprises a focus tunable lens disposed in a bottom portion of the image head and positioned between the target of interest and the first lens in the optical path for focusing light from the illuminated target of interest in a surgical field.

In one embodiment, the imaging head further comprises a first linear polarizer positioned in front of the illumination.

In one embodiment, the detector comprises at least one camera. In one embodiment, the at least one camera comprises at least one charge-coupled device (CCD) camera and/or at least one complementary metal oxide semiconductor (CMOS) camera. In one embodiment, the at least one camera comprises at least one infrared camera and/or at least one camera near-infrared (NIR) camera.

In one embodiment, the system further comprises at least one laser pointer arranged in relation to the detector such that its beam is co-localized with a center of the field of view of the detector at a distance.

In one embodiment, the system further comprises a lens tube containing at least one lens arranged in relation to the target of interest, wherein the light source is optically coupled to the lens tube for illuminating a spot having a diameter at a distance on the target of interest.

In one embodiment, the system further comprises a controller configured to control operations of the imaging head for acquiring the auto-fluorescence and LSCI images of the illuminated target of interest, receive the acquired auto-fluorescence and LSCI images from the detector, and process the acquired auto-fluorescence and LSCI images to obtain speckle contrast images for the intraoperative assessment of parathyroid gland viability. In one embodiment, in the speckle contrast images, a perfused parathyroid gland has low speckle contrast, and a devascularized parathyroid gland has high speckle contrast.

In one embodiment, the system further comprises a display for displaying the speckle contrast images of the parathyroid gland in real-time.

In another aspect, the invention relates to a method for intraoperative guidance in a surgery. In one embodiment, the methods includes providing a beam of light to illuminate a target of interest; acquiring auto-fluorescence images and laser speckle contrast imaging (LSCI) images of light from the illuminated target of interest responsive to the illumination; and processing the acquired auto-fluorescence and LSCI images for intraoperative guidance in a surgery.

In one embodiment, said processing the acquired auto-fluorescence and LSCI images comprises cropping a background-subtracted auto-fluorescence image to remove first pixels on each edge; thresholding the cropped auto-fluorescence image into first, second and third intensity levels using a multiple thresholding scheme, wherein the first intensity level is corresponding to a low intensity background; setting the second intensity level equal to the low intensity background, resulting in an image having a distinction between the parathyroid gland of interest and everything else; filtering the resulted image using a two-dimensional Gaussian to locate a dominant cluster of points, wherein the dominant cluster of points is corresponding to the parathyroid gland; converting the filtered image to an edge map; and fitting an active contour model to the edge map to obtain the contour demarcating the parathyroid gland.

In one embodiment, said processing the acquired auto-fluorescence and LSCI images further comprises, prior to said the background-subtracted auto-fluorescence image filtering an acquired auto-fluorescence image with a Gaussian profile; and registering the filtered auto-fluorescence image to a first speckle contrast image.

In one embodiment, said processing the acquired auto-fluorescence and LSCI images further comprises imaging an irregular grid by two cameras to determine a rigid transformation that aligns the fields of the two cameras together, wherein one of the two cameras is adapted for acquiring the auto-fluorescence images and the other of two cameras is adapted for acquiring the LSCI images. In one embodiment, the rigid transformation is determined using an intensity-based image registration.

In one embodiment, said processing the acquired auto-fluorescence and LSCI images comprises after obtaining the contour, applying the rigid transformation to demarcate the parathyroid gland in the first speckle contrast image of the acquired series of speckle contrast images; registering the remaining subsequent speckle contrast images of the acquired series of speckle contrast images into the first speckle contrast image using a discrete Fourier transform registration that only accounts for translation; averaging the acquired series of speckle contrast images to obtain the average speckle contrast of the parathyroid area within the transformed contour so as to improve spatial resolution; and converting the value to a percent likelihood of parathyroid devascularization using a logistic regression model.

In one embodiment, the method further comprises for displaying the speckle contrast images of the parathyroid gland in real-time.

In yet another aspect, the invention relates to a non-transitory tangible computer-readable medium storing instructions which, when executed by one or more processors, cause the above-disclosed method for processing auto-fluorescence and LSCI images for intraoperative guidance in a surgery to be performed.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The following drawings form part of the present specification and are included to further demonstrate certain aspects of the invention. The invention may be better understood by reference to one or more of these drawings in combination with the detailed description of specific embodiments presented herein. The drawings described below are for illustration purposes only. The drawings are not intended to limit the scope of the present teachings in any way.

FIG. 2A shows a view of the device in the operating room. FIG. 2B is a view of an imaging head of the system. FIGS. 2C-2D show perspective and cross-sectional views of the imaging head, respectively. FIGS. 2E-2F are two perspective views showing optical paths inside the imaging head for acquiring auto-fluorescence images and LSCI images, respectively. FIG. 2G is an optical layout of the system.

FIG. 3A shows a view of the device in the operating room. FIG. 3B is an optical layout of the system, where DBS represents a dichroic beamsplitter, L1 represents a first lens, L2 represents a second lens, L3 represents a third lens, LP represents a linear polarizer, LPF represents a long-pass filter, M represents a mirror, NDF represents a neutral density filter, respectively.

FIGS. 5A-5F shows parathyroid localization steps according to one embodiment of the invention: starting with background-subtracted fluorescence image (FIG. 5A), threshold into 3 levels ((FIG. 5B); setting a second intensity level equal to background ((FIG. 5C), then locating the dominant cluster of points ((FIG. 5D); creating edge map based on this cluster of points (FIG. 5E) and fitting an active contour model to the edge ((FIG. 5F).

DETAILED DESCRIPTION OF THE INVENTION

Figure 1:
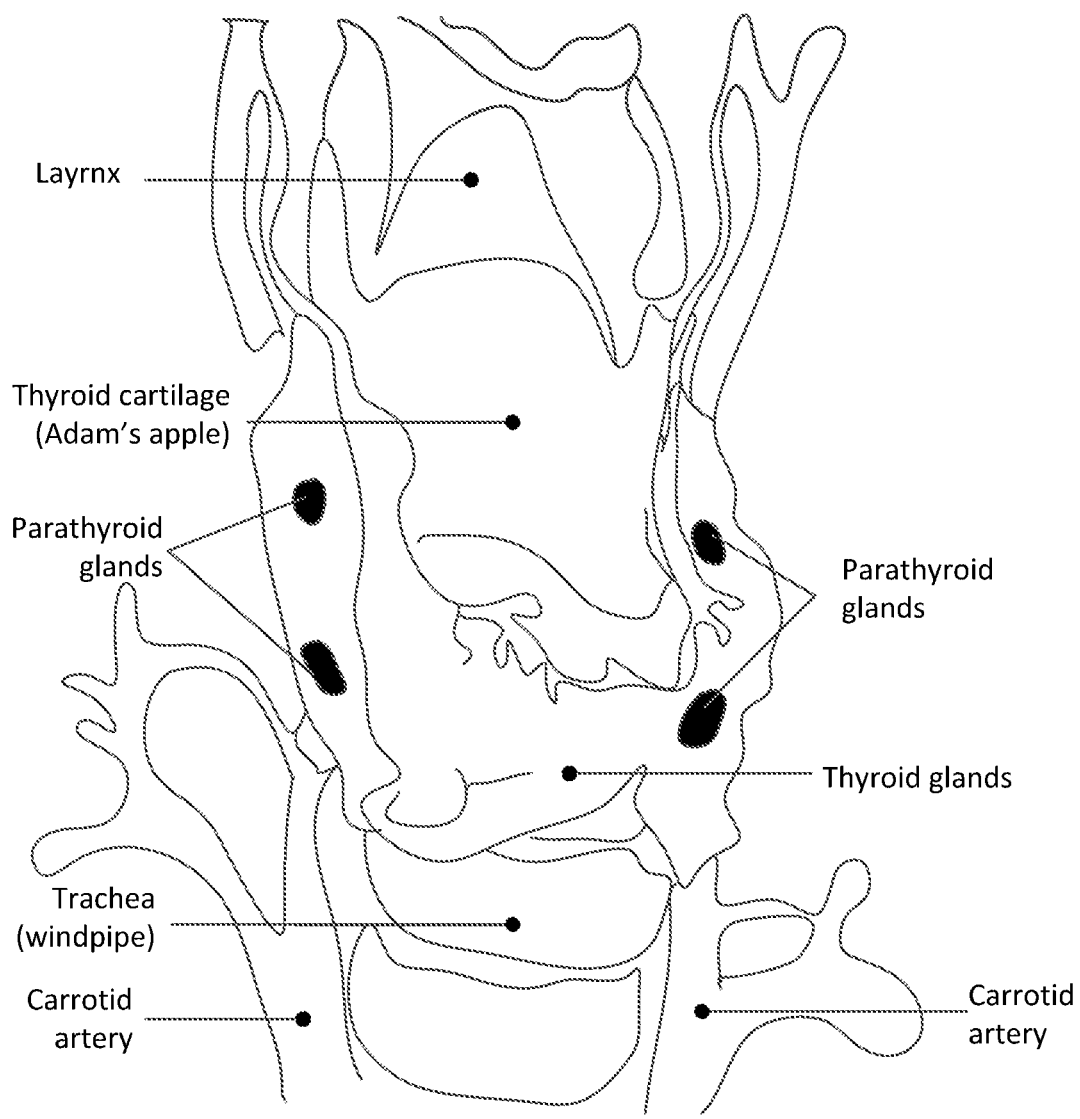
FIG. 1 shows a general view of the anatomy of human thyroid/parathyroid glands.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that, as used in the description herein and throughout the claims that follow, the meaning of "a", "an", and "the" includes plural reference unless the context clearly dictates otherwise. Also, it will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

As used in this disclosure, the term "living subject" refers to a human being such as a patient, or a mammal animal such as a monkey.

As used in this disclosure, the term "auto-fluorescence" refers to the fluorescence produced by a molecule of interest without the use of exogenous markers. Auto-fluorescence may serve as a useful diagnostic indicator such as in the case of "biological auto-fluorescence", which refers to the fact that cells contain molecules, which become fluorescent when excited by UV/VIS (typically 400-700 nm) radiation of suitable wavelength. This fluorescence emission, arising from endogenous fluorophores, is an intrinsic property of cells and is called auto-fluorescence to be distinguished from fluorescence signals obtained by adding exogenous markers. The majority of cell auto-fluorescence originates from mitochondria and lysosomes. Together with aromatic amino acids and lipo-pigments, the most important endogenous fluorophores are pyridinic (NADPH) and flavin coenzymes. In tissues, the extracellular matrix often contributes to the auto-fluorescence emission more than the cellular component, because collagen and elastin have, among the endogenous fluorophores, a relatively high quantum yield. Changes occurring in the cell and tissue state during physiological and/or pathological processes result in modifications of the amount and distribution of endogenous fluorophores and chemical-physical properties of their microenvironment. Therefore, analytical techniques based on auto-fluorescence monitoring may be utilized in order to obtain information about morphological and physiological state of cells and tissues. Moreover, auto-fluorescence analysis can be performed in real time because it does not require any treatment of fixing or staining of the specimens.

As used in this disclosure, the term, "laser speckle contrast imaging" or its abbreviation "LSCI" refers to a technique for imaging flow for assessment of parathyroid gland vascularity during endocrine surgery, which utilizes intrinsic tissue contrast from dynamic light scattering and provides a relatively simple technique for visualizing detailed spatiotemporal dynamics of blood flow changes in real-time. Laser speckle is the random interference pattern produced when coherent light scatters from a random medium and can be imaged onto a detector. Motion from scattering particles, such as red blood cells in the vasculature, leads to spatial and temporal variations in the speckle pattern. Speckle contrast analysis quantifies the local spatial variance, or blurring, of the speckle pattern that results from blood flow. Areas with greater motion have more rapid intensity fluctuations and therefore have more blurring of the speckles during the camera exposure time. LSCI can be used to quantify relative changes in blood flow.

The LSCI technique analyzes the interference pattern produced when coherent light is incident on a surface. Minute differences in path length created by the light waves scattering from different regions of the surface produce bright and dark spots of constructive and destructive interference respectively, termed as a speckle pattern. This speckle pattern fluctuates depending on how fast particles are moving within a few microns of the surface. Blurring of the speckle pattern occurs when the motion is fast relative to the integration time of the detector. Analyzing this spatial blurring provides contrast between regions of faster versus slower motion and forms the basis of LSCI. This technique is sensitive to microvascular perfusion and has been employed in a variety of tissues where the vessels of interest are generally superficial, such as the retina, skin and brain. Parathyroid glands are densely packed with blood vessels, given that they secrete PTH to the entire body. Furthermore, their small size (3-8 mm) makes many of these vessels superficial, making these glands suitable targets for assessment using LSCI. Certain aspects of this invention disclose a combined auto-fluorescence and LSCI system for assessment of parathyroid gland vascularity during endocrine surgery.

As used in this disclosure, "charge-coupled device" or "CCD" refers to an analog shift register that enables the transportation of analog signals (electric charges) through successive stages (capacitors), controlled by a clock signal. Charge-coupled devices can be used as a form of memory or for delaying samples of analog signals. Today, they are most widely used in arrays of photoelectric light sensors to serialize parallel analog signals. In a CCD for capturing images, there is a photoactive region (an epitaxial layer of silicon), and a transmission region made out of a shift register (the CCD, properly speaking).

An image is projected through a lens onto the capacitor array (the photoactive region), causing each capacitor to accumulate an electric charge proportional to the light intensity at that location. A one-dimensional array, used in line-scan cameras, captures a single slice of the image, while a two-dimensional array, used in video and still cameras, captures a two-dimensional picture corresponding to the scene projected onto the focal plane of the sensor. Once the array has been exposed to the image, a control circuit causes each capacitor to transfer its contents to its neighbor (operating as a shift register). The last capacitor in the array dumps its charge into a charge amplifier, which converts the charge into a voltage. By repeating this process, the controlling circuit converts the entire semiconductor contents of the array to a sequence of voltages, which it samples, digitizes and stores in some form of memory.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

To address the aforementioned deficiencies and inadequacies, the invention in one aspect discloses an imaging system capable of performing both auto-fluorescence and laser speckle contrast imaging (LSCI) intraoperatively for guidance in a surgery. This system is developed to guide surgeons performing thyroid and parathyroid surgeries, which allows a surgeon to objectively identify a parathyroid gland during surgery and assess its viability. Auto-fluorescence imaging helps identify the parathyroid, while LSCI helps assess its viability.

To the inventors' knowledge, combination of the two imaging modalities (fluorescence and LSCI) into one clinical instrument according to the invention has not yet been reported at the time when the invention was made.

Figures 2A, 2B:
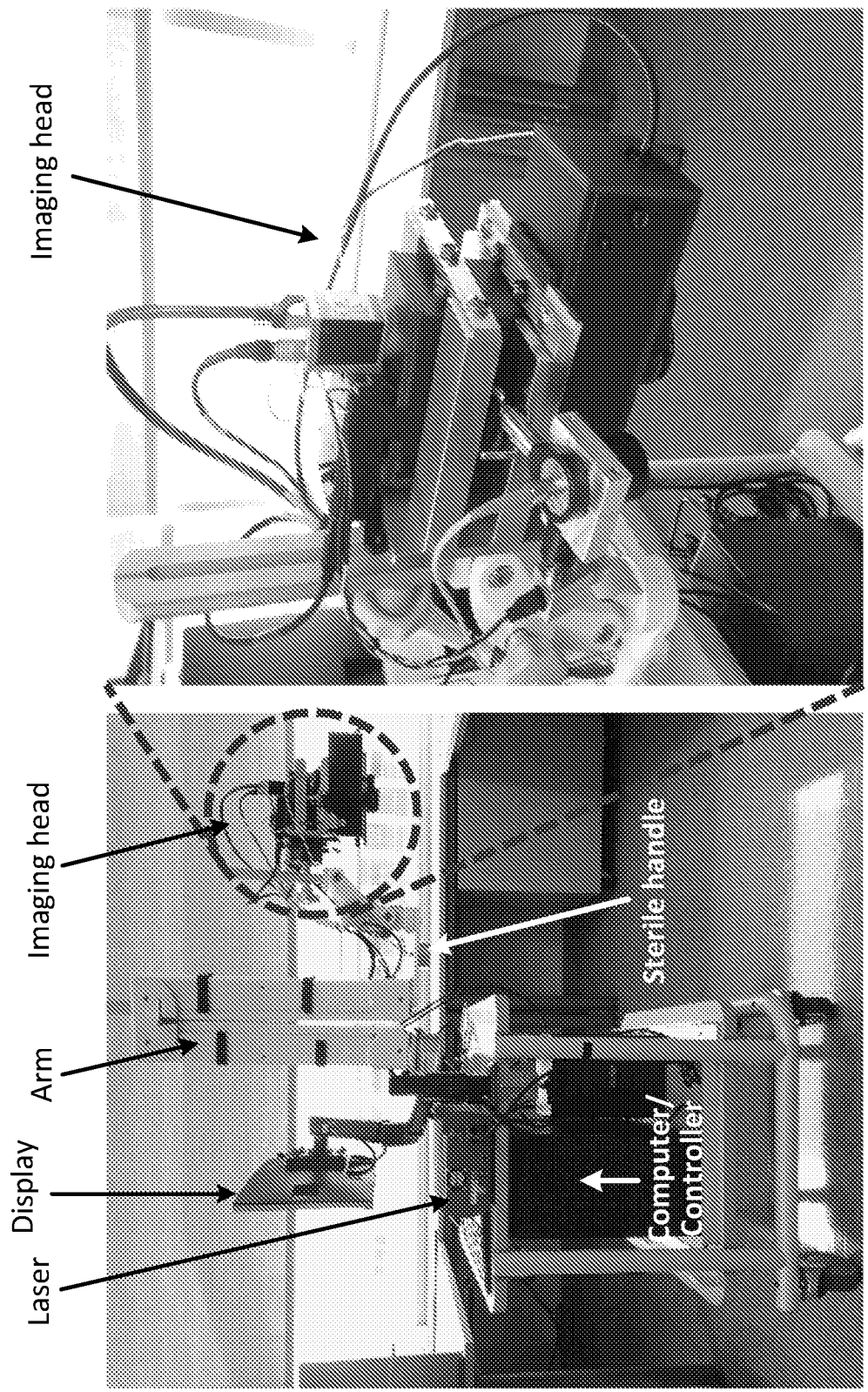
FIGS. 2A-2G shows schematically a combined auto-fluorescence and laser speckle contrast imaging (LSCI) system (alternatively, device or apparatus) for intraoperative assessment of parathyroid gland vascularity of a living subject according to one embodiment of the invention.
Figures 2C, 2D:
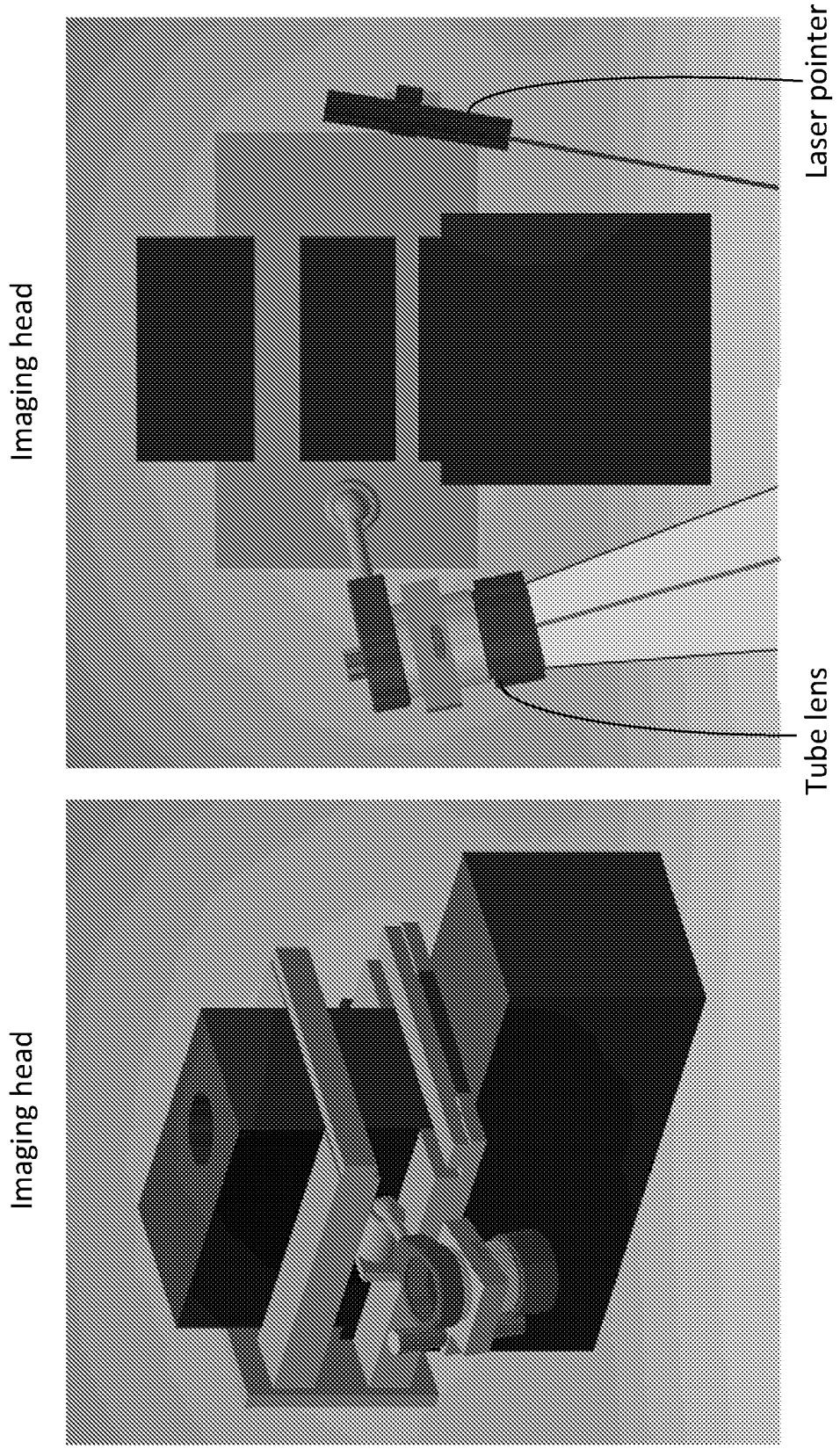
Figure 2F:
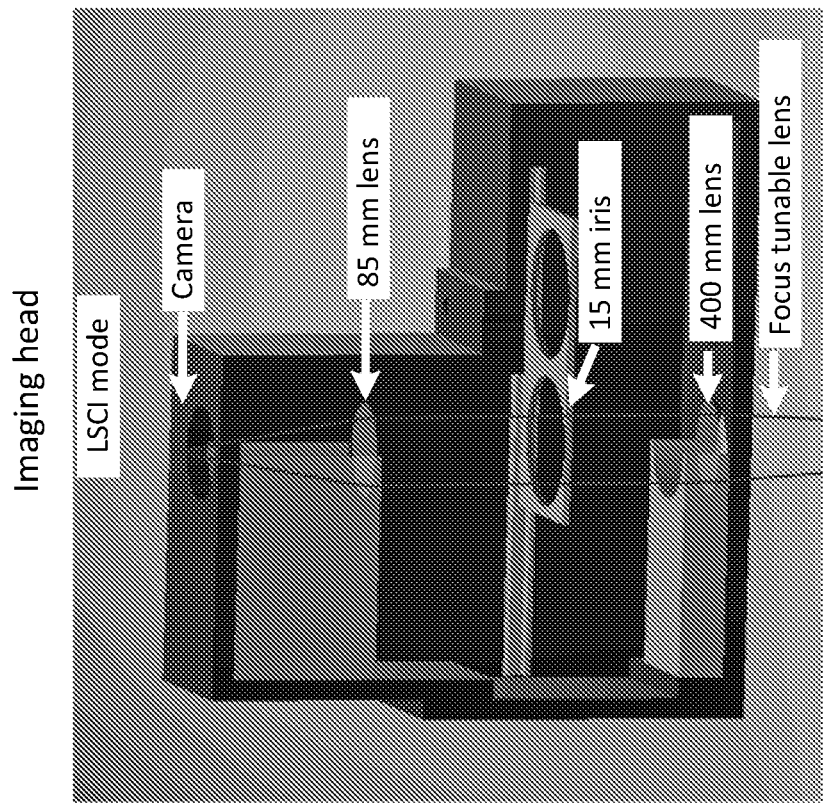
Figure 2E:
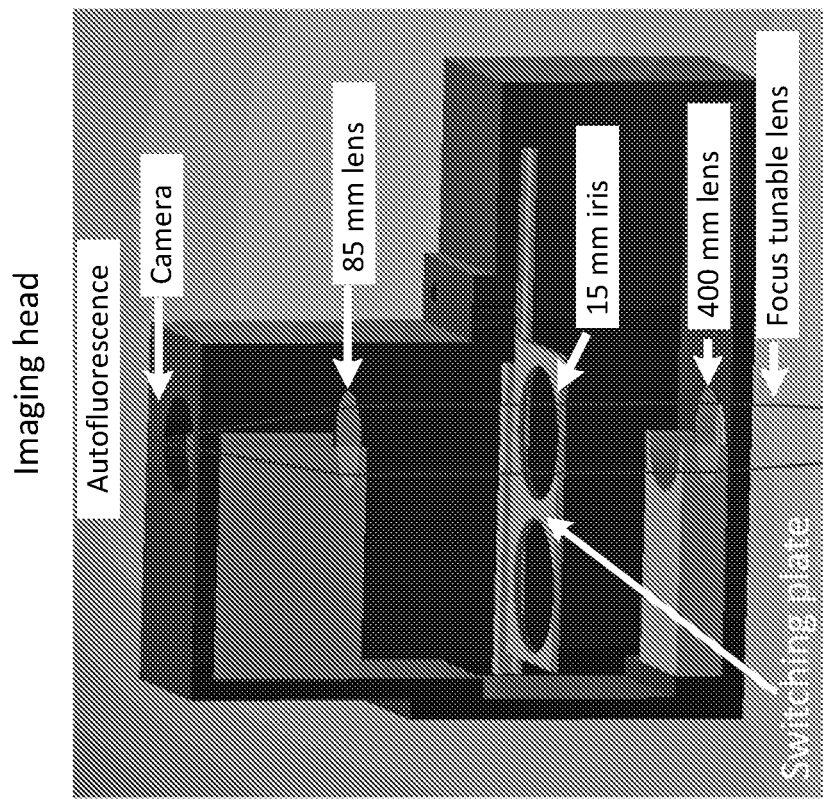
Figure 2G:
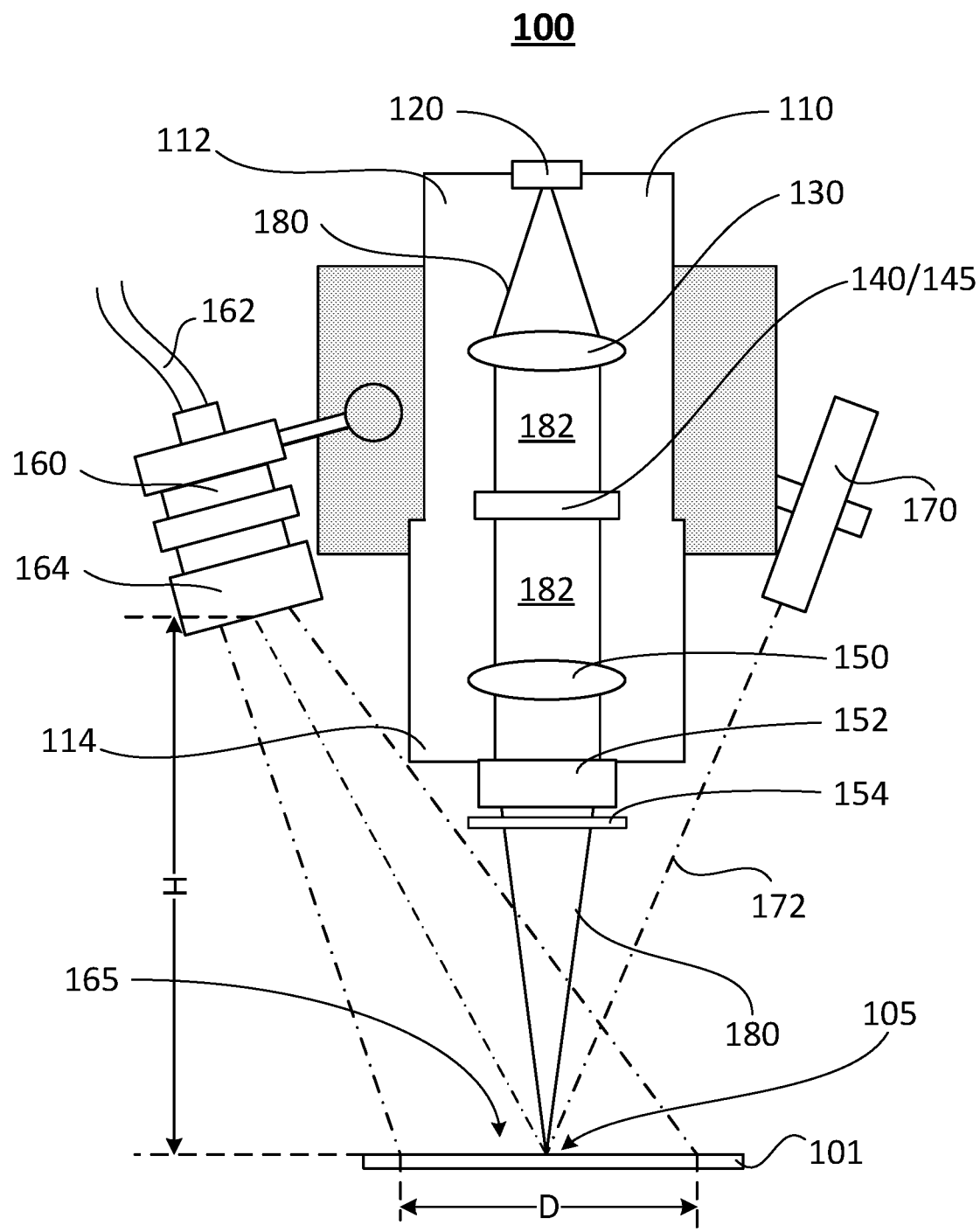

Referring to FIGS. 2A-2G, and particularly to FIG. 2G, the combined auto-fluorescence imaging and LSCI system are shown according to one embodiment of the invention. The system includes a light source for emitting a beam of light to illuminate a target of interest 105; and an imaging head 100 positioned over the target of interest 105 for acquiring auto-fluorescence images and LSCI images of light from the illuminated target of interest 105 responsive to the illumination.

In certain embodiments, the light source is, but not limited to, an infrared laser. The infrared laser is a diode laser emitting the beam of light at a wavelength of about 785 nm.

In the exemplary embodiment, the imaging head 100 comprises a detector 120 disposed in a top portion 112 of the image head 100 for individually acquiring the auto-fluorescence images and the LSCI images; and a first lens 150 and a second lens 130 positioned in an optical path 182. The first lens 150 is adapted for collecting the light from the illuminated target of interest 105 in a surgical field, and the second lens is adapted focusing the collected light to the detector.

In certain embodiments, a ratio of a focal length of the first lens to that of the second lens is about 80/17. In one embodiment, the first lens is, but not limited to, a 400 mm lens, and the second lens is, but not limited to, an 85 mm lens. It should be appreciated that any set of lenses with a similar ratio of focal lengths can be utilized to practice the invention, for example, a 500 mm lens and a 100 mm lens. The choice of the 400 mm and 85 mm lenses was mainly to have a large working distance (400 mm) while keeping the imaging head relatively compact.

The imaging head 100 also has a movable switching plate accommodating filters 140 and an iris 145, as shown in FIGS. 2E-2G, being located between the first lens 150 and the second lens 130. The movable switching plate operably moves between a first position and a second position. When the movable switching plate is in the first position, the filters 140 are positioned in the optical path 182 (FIG. 2E) and the detector operably acquires the auto-fluorescence images. When the movable switching plate is in the second position, the iris 145 is positioned in the optical path (FIG. 2F) and the detector acquires the LSCI images. In one embodiment, the filters includes, but are not limited to, a combination of an 808 nm long-pass filter and an 800 nm long-pass filter, and the iris comprises, but is not limited to, a 15 mm diameter iris. It should be appreciated that any long-pass or band-pass filters between the range of about 800 nm to about 830 nm can be utilized to practice the invention. In addition, for this configuration, any iris size less than 15 mm also works provided there is enough light. The 15 mm diameter of an iris is the limit to satisfy an equation regarding speckle size.

Furthermore, the imaging head 100 includes a linear actuator (not shown) configured to move the movable switching plate between the first position and the second position.

In addition, the imaging head 100 further comprises a focus tunable lens 152 disposed in a bottom portion 114 of the image head 100 and positioned between the target of interest 105 and the first lens 150 in the optical path 182 for focusing light 180 from the illuminated target of interest 105 in a surgical field.

Moreover, the imaging head 100 comprises a first linear polarizer 154 positioned in the optical path between the focus tunable lens 152 and the target of interest 105.

In certain embodiments, the detector 120 comprises at least one camera. In one embodiment, the at least one camera comprises at least one charge-coupled device (CCD) camera and/or at least one complementary metal oxide semiconductor (CMOS) camera. In one embodiment, the at least one camera comprises at least one infrared camera and/or at least one camera near-infrared (NIR) camera.

In certain embodiments, the system further comprises at least one laser pointer 170 arranged in relation to the detector 120 such that its beam 172 is co-localized with a center of the field of view of the detector 120 at a distance. For example, two laser pointers, 532 nm and 650 nm, (output power <5 mW) attached on the sides of the imaging head 100 guide a surgeon in positioning the imaging head 100 so that the target of interest 105 in roughly in the center of the field of view and in focus when imaging, as shown in FIG. 2G.

Also referring to FIG. 2G, the system also has a lens tube 160 containing at least one lens arranged in relation to the target of interest 105. The light source is optically coupled to the lens tube 160 for illuminating a spot 165 having a diameter D at a distance H on the target of interest 105.

In addition, as shown in FIG. 2A, the system further comprises a controller (alternatively computer) configured to control operations of the imaging head for acquiring the auto-fluorescence and LSCI images of the illuminated target of interest, receive the acquired auto-fluorescence and LSCI images from the detector, and process the acquired auto-fluorescence and LSCI images to obtain speckle contrast images for the intraoperative assessment of parathyroid gland viability. In one embodiment, in the speckle contrast images, a perfused parathyroid gland has low speckle contrast, and a devascularized parathyroid gland has high speckle contrast.

In one embodiment, the system further comprises a display for displaying the speckle contrast images of the parathyroid gland in real-time, as shown in FIG. 2A.

Figures 3A, 3B:
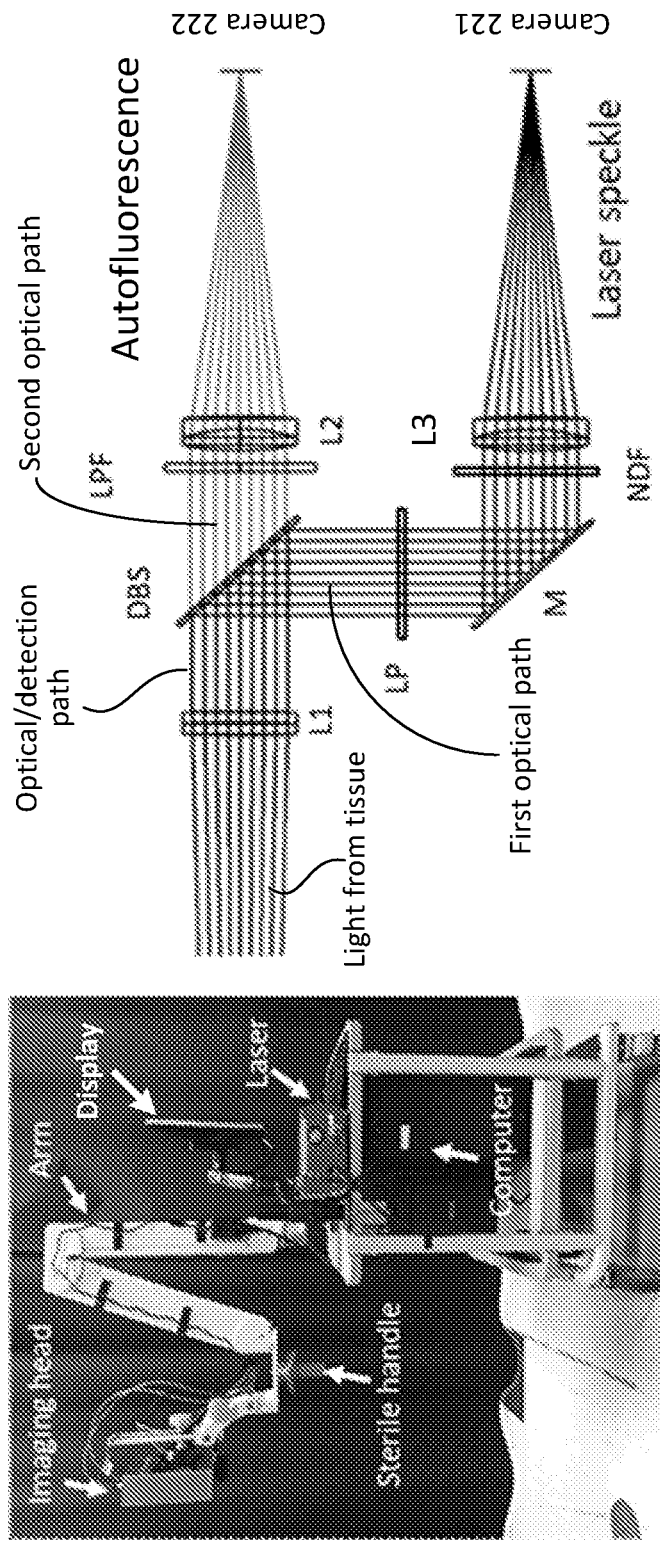
FIGS. 3A-3B show schematically a combined auto-fluorescence and laser speckle contrast imaging (LSCI) system for intraoperative assessment of parathyroid gland vascularity of a living subject according to one embodiment of the invention.

In another embodiment, as shown in FIG. 3A, the LSCI and auto-fluorescence imaging system is generally similar to LSCI and auto-fluorescence imaging system shown in FIG. 2A. Except that an alternative design of the imaging head, which includes two cameras 221 and 222, instead of a single camera 120 in the embodiment shown in FIGS. 2A-2G, and places a beamsplitter DBS in the optical/detection path to simultaneously collect fluorescence (by camera 222) and laser speckle images (by camera 221).

Specifically, as shown in FIG. 3B, the imaging head includes a beamsplitter DBS positioned between the first lens L1 and the second lens L2 in the optical path for reflecting and transmitting the collected light into a first path and a second path, respectively, and a third lens L3 positioned in the first path. The reflected light in the first path is focused by the third lens L3 to a first camera 221 of the detector for acquiring the LSCI images, while the transmitted light in the second path is focused by the second lens L2 to a second camera 222 of the detector for acquiring the auto-fluorescence images.

In addition, the imaging head further has a linear polarizer LP positioned between the beamsplitter DBS and the third lens L3 in the first path, and configured to have its axis of polarization oriented perpendicular to that on the illumination reducing specular reflections.

Furthermore, the imaging head further comprises a mirror M positioned between the linear polarizer LP and the third lens L3 in the first path for achieving compactness.

Also, the imaging head has an 808 nm long-pass filter LPF positioned between the beamsplitter DBS and the second lens L2 in the second path, and a neutral density filter NDF positioned between the beamsplitter DBS and the third lens L3 in the first path. The neutral density filter is configured to reduce the intensity of the laser light so it does not saturate the camera. In one embodiment, the neutral density filter is a 1.3 O.D. neutral density filter. Alternatively, if the laser is not so powerful it may not be needed, or a lower optical density may work, e.g. 0.5 O.D.

In another aspect of the invention, the method for intraoperative assessment of parathyroid gland viability of a living subject for guidance in a surgery includes providing a beam of light to illuminate a target of interest; acquiring auto-fluorescence images and laser speckle contrast imaging (LSCI) images of light from the illuminated target of interest responsive to the illumination; and processing the acquired auto-fluorescence and LSCI images for intraoperative guidance in a surgery.

Referring to FIGS. 4 and 5A-5F, said processing the acquired auto-fluorescence and LSCI images comprises cropping a background-subtracted auto-fluorescence image (FIG. 5A) to remove first pixels on each edge; thresholding the cropped auto-fluorescence image into first, second and third intensity levels using a multiple thresholding scheme (FIG. 5B), wherein the first intensity level is corresponding to a low intensity background; setting the second intensity level equal to the low intensity background, resulting in an image (FIG. 5C) having a distinction between the parathyroid gland of interest and everything else; filtering the resulted image using a two-dimensional Gaussian to locate a dominant cluster of points, wherein the dominant cluster of points is corresponding to the parathyroid gland (FIG. 5D); converting the filtered image to an edge map (FIG. 5E); and fitting an active contour model to the edge map to obtain the contour demarcating the parathyroid gland (FIG. 5F).

Additionally, said processing the acquired auto-fluorescence and LSCI images comprises, prior to said the background-subtracted auto-fluorescence image, filtering an acquired auto-fluorescence image with a Gaussian profile; and registering the filtered auto-fluorescence image to a first speckle contrast image.

Further, said processing the acquired auto-fluorescence and LSCI images comprises imaging an irregular grid by two cameras to determine a rigid transformation that aligns the fields of the two cameras together, wherein one of the two cameras is adapted for acquiring the auto-fluorescence images and the other of two cameras is adapted for acquiring the LSCI images. In one embodiment, the rigid transformation is determined using an intensity-based image registration.

Moreover, said processing the acquired auto-fluorescence and LSCI images comprises after obtaining the contour, applying the rigid transformation to demarcate the parathyroid gland in the first speckle contrast image of the acquired series of speckle contrast images; registering the remaining subsequent speckle contrast images of the acquired series of speckle contrast images into the first speckle contrast image using a discrete Fourier transform registration that only accounts for translation; averaging the acquired series of speckle contrast images to obtain the average speckle contrast of the parathyroid area within the transformed contour so as to improve spatial resolution; and converting the value to a percent likelihood of parathyroid devascularization using a logistic regression model.

Also, the method includes for displaying the speckle contrast images of the parathyroid gland in real-time.

It should be noted that all or a part of the methods according to the embodiments of the invention is implemented by hardware or a program instructing relevant hardware.

Yet another aspect of the invention provides a non-transitory computer readable storage medium/memory that stores computer executable instructions or program codes. The computer executable instructions or program codes enable a computer or a similar computing apparatus to complete various operations of the above-disclosed method for processing auto-fluorescence and LSCI images for intra-operative guidance in a surgery. The storage medium/memory may include, but is not limited to, high-speed random access medium/memory such as DRAM, SRAM, DDR RAM or other random access solid state memory devices, and non-volatile memory such as one or more magnetic disk storage devices, optical disk storage devices, flash memory devices, or other non-volatile solid state storage devices.

These and other aspects of the present invention are further described below. Without intent to limit the scope of the invention, examples according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Imaging Systems

Embodiment 1: In this exemplary embodiment as shown in FIGS. 2A-2G, the imaging system is disposed on a cart (FIG. 2A) that can be wheeled into and out of the operating room. On the cart sits the computer that controls the instrument (home-built machine with six 3.7 GHz cores—Intel OEM Core i7-8700K), as well as a single mode 785 nm diode laser with 80 mW power output (Innovative Photonics Solutions, Monmouth Junction, NJ). Attached to the cart is an articulated arm (ICWUSA, Medford, OR) capable of extending about 4 feet from the edge of the cart, and having an attachment for a sterile handle to allow maneuvering by a surgeon. On the end of the arm is the imaging head 100, see FIGS. 2B-2G, particularly FIG. 2G, which acquires both LSCI and fluorescence images by a detector 120 disposed on an optical/detection path 182. The laser source is coupled through a single mode fiber optic patch cable 162 (Thorlabs, Newton, NJ) to a lens tube 150 containing a 75 mm focal length lens (Edmund Optics, Barrington, NJ), illuminating a spot 165 having a diameter D of about 45 mm at a distance H of about 450 mm. Also attached to this lens tube 160 is a linear polarizer 164 (Thorlabs, Newton, NJ)—together with another linear polarizer 154 attached to the front end of the detection path 180, this enables reduction of specular reflections in images. The illumination has a Gaussian profile and the maximum power across the spot 165 was measured to be 4 mW. A 532 nm and 650 nm laser pointer 170 (output power less than 5 mW) attached on either side of a body portion 110 of the imaging head 100 (FIGS. 2D and 2G) guide the surgeon in positioning the system so that the tissue of interest in roughly in the center 105 of the field of view at the object 101 and in focus when imaging, as shown FIG. 2G.

The detection path 182 basically includes two lenses: a 400 mm lens 150 to collect light 180 scattered from the tissue of interest responsive to the illumination from the imaging plane, and an 85 mm lens 130 (Edmund Optics, Barrington, NJ) to focus this light 180 onto the detector (camera sensor) 120. The camera 120 is a near-infrared optimized Basler acA1300-60 gmNIR (Basler AG, Ahrensburg, Germany). The imaging head 100 is designed to use one camera 120 to acquire both fluorescence and laser speckle images. This is achieved by sliding either a combination 140 of an 808 nm long-pass filter (Semrock, Rochester, NY) and an 800 nm long-pass filter (Midwest Optical Systems, Palatine, IL), or a 15 mm diameter iris 145 into the detection path 182 in-between the two lenses 150 and 130, where the filters 140 are in place for fluorescence, and the iris 145 for LSCI, respectively, (see FIGS. 2E-2G). Remotely switching the switching plate that accommodates the filters 140 and iris 145 (see FIGS. 2E-2F) between the filters 140 and iris 145 in the detection path 182 is achieved using a linear actuator (Actuonix Motion Devices, Victoria, BC, Canada). In front of the 400 mm lens 150 is a focus tunable lens 152 (Optotune, Dietikon, Switzerland), the purpose of which is to enable remote image focusing, and attached to the front of the focus tunable lens 152 is the another linear polarizer 154.

This system is developed to guide surgeons performing thyroid and parathyroid surgeries, which allows a surgeon to objectively identify a parathyroid gland during surgery and assess its viability. Auto-fluorescence imaging helps identify the parathyroid, while LSCI helps assess its viability.

Embodiment 2: This exemplary embodiment is an alternative design of the imaging head that includes two cameras, instead of a single camera 120 in the embodiment shown in FIGS. 2A-2G, and places a beam splitter in the optical/detection path to simultaneously collect fluorescence (by camera 222) and laser speckle images (by camera 221), as shown in FIGS. 3A-3B.

The LSCI and auto-fluorescence imaging system is developed in-house for the purpose of thyroid and parathyroid surgical guidance, as depicted in FIGS. 3A-3B, is generally similar to LSCI and auto-fluorescence imaging system shown in FIG. 2A. The device is constructed on a cart that can be wheeled into and out of the operating room. As shown in FIG. 3A, on the cart sits a computer that controls the instrument (home-built machine with six 3.7 GHz cores—Intel OEM Core i7-8700K), as well as a single mode 785 nm diode laser with 60 mW power output (Innovative Photonics Solutions, Monmouth Junction, N.J.). Attached to the cart is an articulated arm (ICWUSA, Medford, OR) capable of extending about 4 feet from the edge of the cart, and having an attachment for a sterile handle to allow maneuvering by the surgeon. On the end of the arm is the imaging head that acquires both LSCI and auto-fluorescence images. The laser source is coupled through a single mode fiber optic patch cable (Thorlabs, Newton, NJ) to a lens tube attached on the exterior of the imaging head. This lens tube contains a 75 mm focal length lens (Edmund Optics, Barrington, NJ), illuminating a ~30 mm diameter spot at a distance of 400 mm. Also attached to this lens tube is a linear polarizer (Thorlabs, Newton, NJ). The illumination has an approximately Gaussian profile and the maximum power across the spot was measured to be 4.8 mW. Two laser pointers, 532 nm and 650 nm, (output power <5 mW) attached on the sides of the imaging head guide the surgeon in positioning the device so that the tissue of interest in roughly in the center of the field of view and in focus when imaging.

Light scattered from the tissue is detected in the imaging head through one of two similar optical paths, depending on the wavelength. As shown in FIG. 3B, both paths share a 400 mm focal length lens L1 (Edmund Optics, Barrington, NJ) which collects the scattered light from the imaging plane and collimates it onto an 801 nm dichroic beamsplitter DBS (Semrock, Rochester, NY). The light scattered from the tissue (resulting in speckle images) reflects off the dichroic beamsplitter DBS and is focused by an 85 mm lens L3 (Edmund Optics, Barrington, NJ) onto a near-infrared-optimized camera 222 (Basler AG, Ahrensburg, Germany). Between the dichroic beamsplitter DBS and the lens L3 is a second linear polarizer LP that has its axis of polarization oriented perpendicular to that on the illumination in order to reduce specular reflections. Also in front of the lens L3 is a 1.3 O.D. neutral density filter NDF (Thorlabs, Newton, NJ) to improve visualization of speckles on the sensitive camera 222 (i.e. avoid saturation). The first optical path is folded to achieve compactness by inserting a silver mirror M (Thorlabs, Newton, NJ) after the polarizer LP. Modeling in Zemax 13 (Zemax, Kirkland, Washington) showed that this configuration results in a minimum detectable speckle size that is roughly twice the camera pixel size, which it has been shown that not matching this criterion leads to underestimation of speckle contrast when performing LSCI.

In the second optical path, the longer wavelength fluorescence is transmitted through the dichroic beamsplitter DBS and is further filtered by an 808 nm long-pass filter LPF (Semrock, Rochester, NY). It is then focused by another 85 mm lens L2 onto a second near-infrared-optimized camera 222. Lastly, there is a focus tunable lens (Optotune, Dietikon, Switzerland) attached to the front of the imaging head, before the 400 mm lens L1, which the purpose of focus tunable lens is to enable small remote adjustments in focus to help ensure images acquired in surgery are in focus. The field of view of the imaging system at the working distance of 400 mm is about 26×32 mm. The device is controlled with a custom program created using LabVIEW 2017 (National Instruments, Austin, TX).

Intraoperative Imaging Procedure

Two patients undergoing parathyroidectomy at Vanderbilt University Medical Center were recruited under a larger study approved by the Institutional Review Board, and written informed consent was obtained prior to participation. Since transporting the device to and from the operating room (OR) over time could result in slight shifts in the positions of the two cameras, there is a need to know how offset they are for each case. Therefore, an irregular grid was imaged on a table off to one side of the OR before each case and the images obtained were used to determine the rigid transformation that aligns the fields of the two cameras together. This is done using intensity-based image registration and is accomplished with the click of a button on the LabVIEW program. Thereafter, once a parathyroid has been localized in a fluorescence image, this transformation can be applied to the identified contour to demarcate the parathyroid in the corresponding speckle contrast image and automatically determine viability. Intraoperative imaging followed one of two procedures depending on the health status of the gland being imaged. For a diseased gland, after locating and exposing the gland, the surgeon positions the device above the surgical field guided by the laser pointers. One set of images (a single fluorescence image and a series of speckle contrast images) is acquired at this point. Generating the fluorescence image involves first acquiring a background frame with the laser off, then acquiring a second image with the laser on and subtracting the former from the latter. Speckle contrast images are generated and displayed simultaneously in real time (about 24 fps) and the first 30 frames after acquiring the raw fluorescence image is saved. After acquiring the images, the surgeon then ligates the blood supply to the diseased parathyroid, which is a part of the standard procedure, and then a second set of images is acquired before excision of the gland. For a healthy gland, only one set of fluorescence and speckle contrast images is acquired and this could occur at any point during the surgery. The camera exposure times for imaging auto-fluorescence and speckle were 300 ms and 5 ms, respectively. During all imaging procedures, the room lights are left on. The surgeon's headlamp and the operating table lamp however have to be turned off or pointed away from the surgical field.

Data Post-Processing

Figure 4:
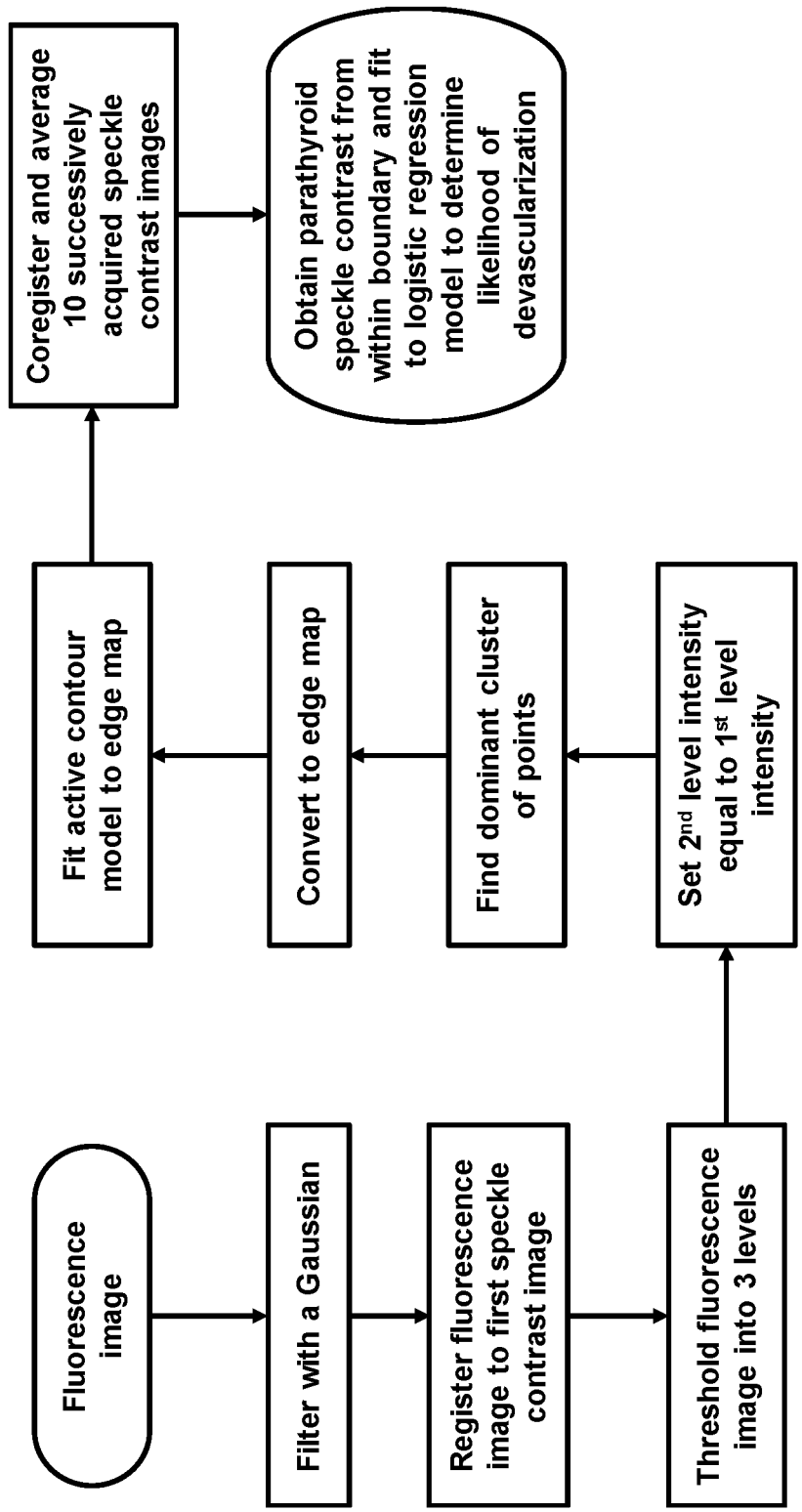
FIG. 4 shows a flowchart of automated image processing according to one embodiment of the invention.

The algorithm developed to automatically segment the parathyroid is described herein according to one embodiment of the invention. Referring to FIGS. 4 and 5A-5B, first, the background-subtracted auto-fluorescence image (FIG. 5A) is cropped to remove the first 200 pixels on each edge (original image size is 1024×1280 pixels), and then thresholded into three levels using a multiple thresholding scheme based on Otsu's method (FIG. 5B). The reason for choosing three levels is that, while the parathyroid is generally the strongest auto-fluorescing tissue in the neck at this wavelength, other tissues such as the thyroid also emit significant fluorescence; choosing three levels allows separation of parathyroid, thyroid (and other less fluorescent tissues), and non-fluorescent background. After thresholding, the middle intensity level (thyroid) is set equal to the low intensity background (FIG. 5C). By this point there should ideally be a clear distinction between the parathyroid gland of interest and everything else, however noise due to specular reflections and imperfect thresholding may still contaminate the image. To reduce this, the next step is to filter the image using a two-dimensional Gaussian in order to locate the dominant cluster of points, the parathyroid gland (FIG. 5D). This filtered image can then be converted to an edge map (FIG. 5E), and an active contour model or "snake" can be fit to this edge map to obtain the contour demarcating the parathyroid gland (FIG. 5F). The force used to drive the active contour towards the parathyroid boundary is based on gradient vector flow. After obtaining the contour, the transformation that aligns the two cameras (determined from imaging the irregular grid) is applied to demarcate the parathyroid in the first of the acquired series of speckle contrast images. Nine subsequent speckle contrast images are registered to the first using a discrete Fourier transform registration that only accounts for translation—since these images are acquired at 24 fps, there is not much motion from frame to frame and a transformation that only relies on translation is sufficient to register them. These ten images are then averaged to improve spatial resolution and the average speckle contrast of the parathyroid (area within the transformed contour) is obtained. Finally, this value can be converted to a percent likelihood of parathyroid devascularization using a logistic regression model based on data accumulated in a previous study. The entire process described above takes about 5 seconds to run on the current computer.

Figure 6A:
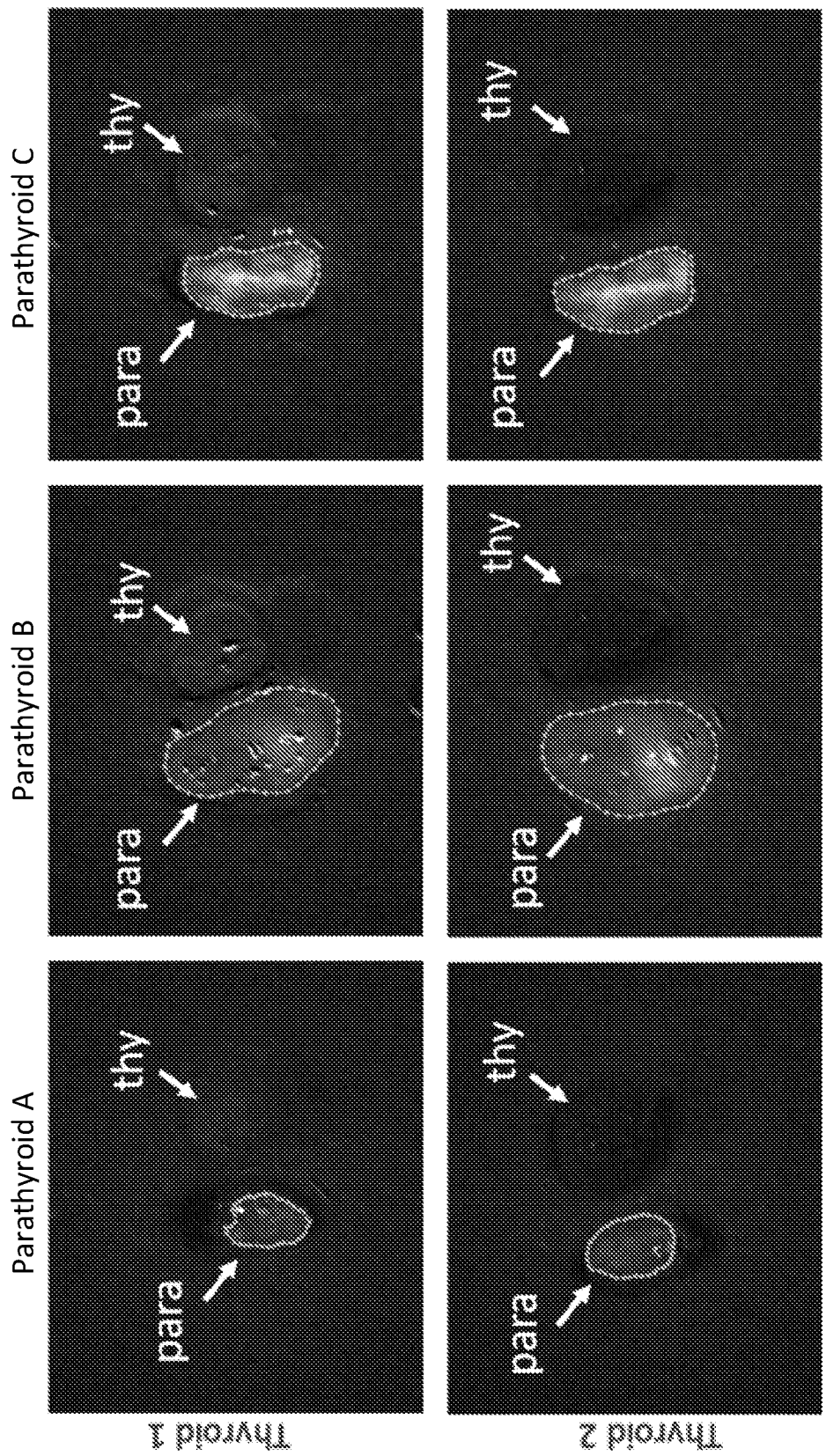
FIGS. 6A-6B show processed images illustrating segmented fluorescence images of parathyroid glands according to embodiments of the invention.
Figure 6B:
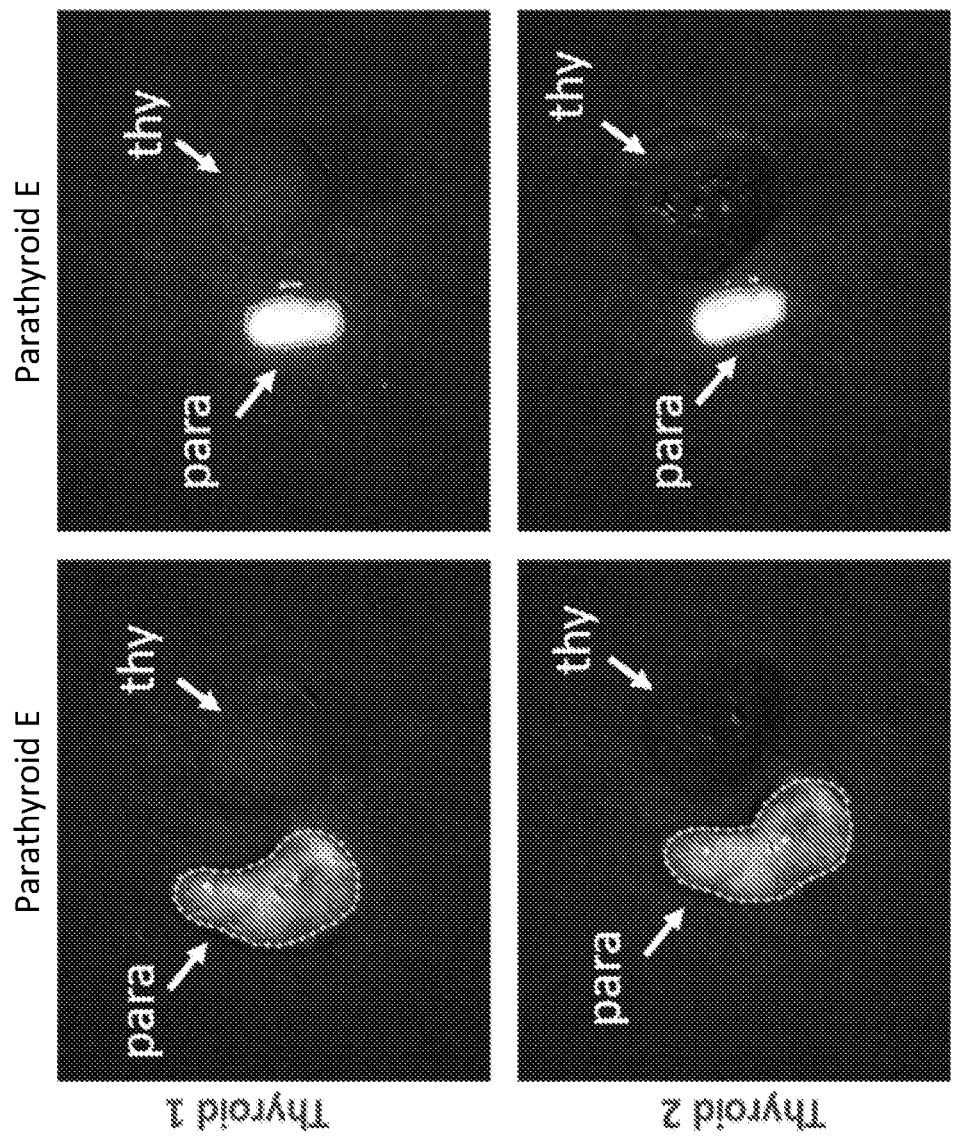

FIGS. 6A-6B show fluorescence images of parathyroid (para) and thyroid (thy) specimens in which the parathyroid has been successfully segmented out by the algorithm (indicated by the cyan contour). There are five parathyroids of different fluorescence intensities, each paired with two thyroid specimens.

Example In Vivo Images

Figure 7B:
FIGS. 7A-7B show an in vivo example of a fluorescence image (FIG. 7A) and probability of parathyroid devascularization (FIG. 7B) according to one embodiment of the invention.
Figure 7A:
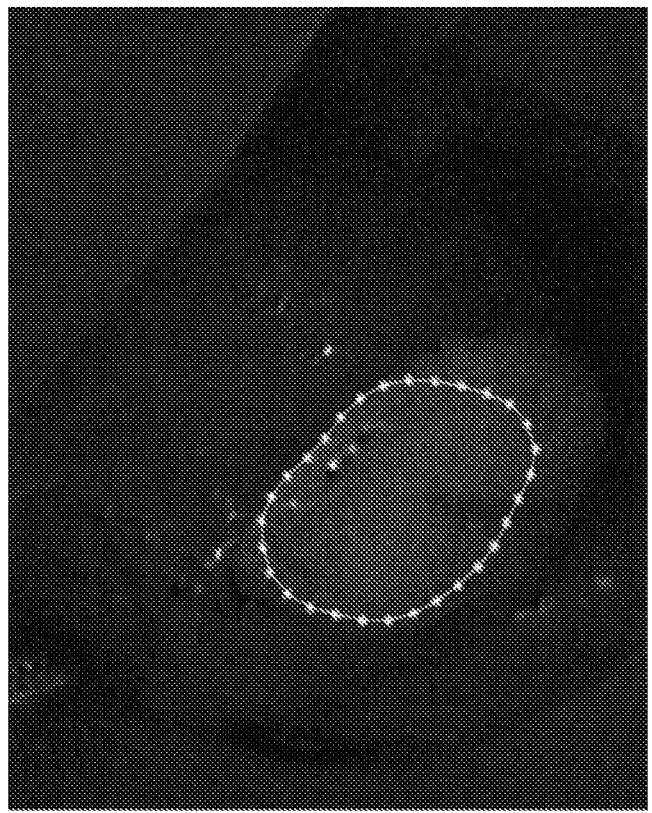

FIGS. 7A-7B show an in vivo example of a fluorescence image (FIG. 7A) and probability of parathyroid devascularization (FIG. 7B) according to one embodiment of the invention. Patient undergoing parathyroidectomy at Vanderbilt University Medical Center. Surgeon ligates blood supply to gland in preparation for removal; images taken after ligation. Parathyroid location used to extract viability information; speckle contrast converted to probability of devascularization using logistic regression model.

Figure 8:
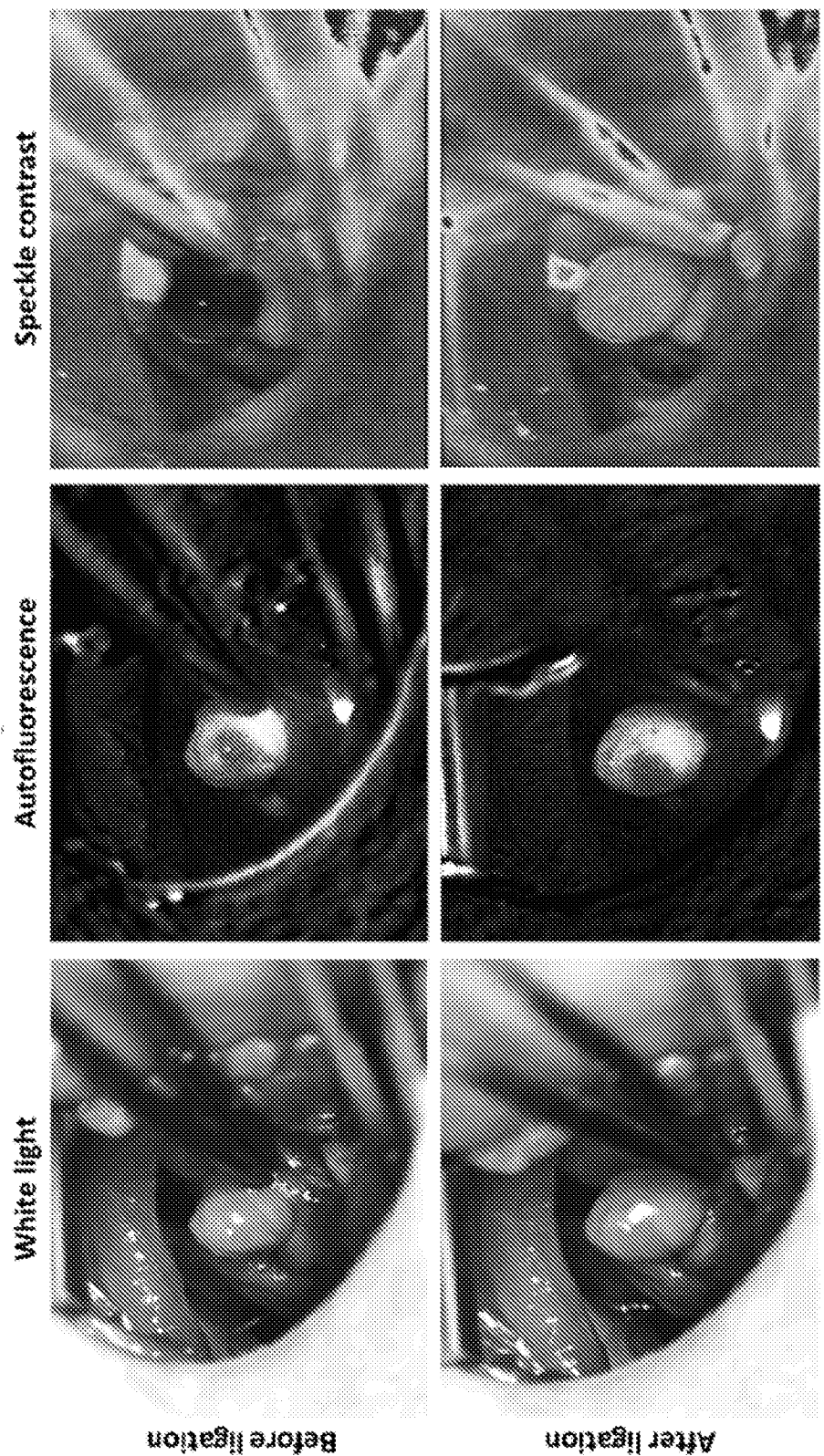
FIG. 8 shows white light, auto-fluorescence and speckle contrast images of a diseased parathyroid gland before and after blood supply ligation, according to one embodiment of the invention. The parathyroid is more fluorescent than surrounding tissue and an increase in speckle contrast after ligation shows devascularization of the gland.

FIG. 8 shows a set of images obtained with the current iteration in a parathyroidectomy case, where images were obtained before and immediately after blood supply ligation. The parathyroid is clearly distinguished in the fluorescence images. As expected, the only observable difference between the before and after images is seen with LSCI where there is an increase in the parathyroid speckle contrast.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. Kirkpatrick, S. J., Duncan, D. D. & Wells-Gray, E. M. Detrimental effects of speckle-pixel size matching in laser speckle contrast imaging. Opt. Lett. 33, 2886 (2008).

[2]. Reddi, S. S., Rudin, S. F. & Keshavan, H. R. An optimal multiple threshold scheme for image segmentation. IEEE Trans. Syst. Man. Cybern. SMC-14, 661-665 (1984).

[3]. Xu, C. & Prince, J. L. Snakes, shapes, and gradient vector flow. IEEE Trans. Image Process. 7, 359-369 (1998).

[4]. Guizar-Sicairos, M., Thurman, S. T. & Fienup, J. R. Efficient subpixel image registration algorithms. Opt. Lett. 33, 156 (2008).

[5]. Mannoh, E. A., Thomas, G., Solórzano, C. C. & Mahadevan-Jansen, A. Intraoperative Assessment of Parathyroid Viability using Laser Speckle Contrast Imaging. Sci. Rep. 7, 14798 (2017).

[6]. Sun, G. H., DeMonner, S. & Davis, M. M. Epidemiological and Economic Trends in Inpatient and Outpatient Thyroidectomy in the United States, 1996-2006. Thyroid 23, 727-733 (2013).

[7]. Pattou, F., Combemale, F., Fabre, S., Carnaille, B., Decoulx, M., Wemeau, J., Radacot, A. & Proye, C. Hypocalcemia following Thyroid Surgery: Incidence and Prediction of Outcome. World J Surgery 22, 718-724 (1998).

[8]. Paras, C., Keller, M., White, L., Phay, J. & Mahadevan-Jansen, A. Near-infrared autofluorescence for the detection of parathyroid glands. J. Biomed. Opt. 16, 067012 (2011).

What is claimed is:

1. A system for intraoperative assessment of parathyroid gland viability of a living subject for guidance in a surgery, comprising:
a light source for emitting a beam of light to illuminate a target of interest; and
an imaging head configured to be positioned over the target of interest for acquiring auto-fluorescence images and laser speckle contrast imaging (LSCI) images of light from the illuminated target of interest responsive to the illumination, wherein the imaging head comprises:
a detector disposed in a top portion of the image head for individually acquiring the auto-fluorescence images and the LSCI images;
a first lens and a second lens positioned in an optical path, wherein the first lens is configured to collect the light from the illuminated target of interest in a surgical field, and the second lens is configured to focus the collected light to the detector; and
a movable switching plate accommodating filters and an iris, being located between the first lens and the second lens, and operably moving between a first position and a second position, such that when the movable switching plate is in the first position, the filters are positioned in the optical path and the detector operably acquires the auto-fluorescence images, and when the movable switching plate is in the second position, the iris is positioned in the optical path and the detector acquires the LSCI images.

2. The system of claim 1, wherein the light source comprises an infrared laser.

3. The system of claim 2, wherein the light source comprises a diode laser emitting the beam of light at a wavelength of about 785 nm.

4. The system of claim 1, wherein a ratio of a focal length of the first lens to that of the second lens is about 80/17.

5. The system of claim 1, wherein the filters comprise a combination of first and second long-pass filters between a range of about 800 nm to about 830 nm, and wherein the iris comprises an iris with a diameter equal to or less than about 15 mm diameter.

6. The system of claim 1, wherein the imaging head further comprises a linear actuator configured to move the movable switching plate between the first position and the second position.

7. The system of claim 6, wherein the imaging head further comprises a beamsplitter positioned between the first lens and the second lens in the optical path for reflecting and transmitting the collected light into a first path and a second path, respectively, and a third lens positioned in the first path, wherein the reflected light in the first path is focused by the third lens to a first camera of the detector for acquiring the LSCI images, and the transmitted light in the second path is focused by the second lens to a second camera of the detector for acquiring the auto-fluorescence images.

8. The system of claim 7, wherein the imaging head further comprises a linear polarizer positioned between the beamsplitter and the third lens in the first path, and configured to have its axis of polarization oriented perpendicular to that on the illumination reducing specular reflections.

9. The system of claim 8, wherein the imaging head further comprises a mirror positioned between the linear polarizer and the third lens in the first path for achieving compactness.

10. The system of claim 7, wherein the imaging head further comprises an 808 nm long-pass filter positioned between the beamsplitter and the second lens in the second path, and a neutral density filter positioned between the beamsplitter and the third lens in the first path.

11. The system of claim 1, wherein the imaging head further comprises a focus tunable lens disposed in a bottom portion of the image head and positioned between the target of interest and the first lens in the optical path for focusing light from the illuminated target of interest in a surgical field.

12. The system of claim 11, wherein the imaging head further comprises a first linear polarizer positioned in front of the illumination.

13. The system of claim 1, wherein the detector comprises at least one camera.

14. The system of claim 13, wherein the at least one camera comprises at least one charge-coupled device (CCD) camera and/or at least one complementary metal oxide semiconductor (CMOS) camera.

15. The system of claim 13, wherein the at least one camera comprises at least one infrared camera and/or at least one camera near-infrared (NIR) camera.

16. The system of claim 1, further comprising at least one laser pointer arranged in relation to the detector such that its beam is co-localized with a center of the field of view of the detector at a distance.

17. The system of claim 1, further comprising a lens tube containing at least one lens arranged in relation to the target of interest, wherein the light source is optically coupled to the lens tube for illuminating a spot having a diameter at a distance on the target of interest.

18. The system of claim 1, further comprises a controller configured to control operations of the imaging head for acquiring the auto-fluorescence and LSCI images of the illuminated target of interest, receive the acquired auto-fluorescence and LSCI images from the detector, and process the acquired auto-fluorescence and LSCI images to obtain speckle contrast images for the intraoperative assessment of parathyroid gland viability.

19. The system of claim 18, wherein the speckle contrast images are obtained such that a perfused parathyroid gland has low speckle contrast, and a devascularized parathyroid gland has high speckle contrast.

20. The system of claim 1, further comprising a display for displaying the speckle contrast images of the parathyroid gland in real-time.

* * * * *